United States Patent
Hu et al.

(10) Patent No.: US 9,722,707 B2
(45) Date of Patent: Aug. 1, 2017

(54) DUAL-CHANNEL ORTHOGONAL CARRIERS ASSISTED OPTICAL SIGNAL TRANSMITTING DEVICE, DIRECT DETECTION METHOD AND SYSTEM

(71) Applicant: Wuhan Research Institute of Posts and Telecommunications, Wuhan (CN)

(72) Inventors: Rong Hu, Wuhan (CN); Qi Yang, Wuhan (CN); Shaohua Yu, Wuhan (CN)

(73) Assignee: WUHAN RESEARCH INSTITUTE OF POSTS AND TELECOMMUNICATIONS, Wuhan (CN)

( * ) Notice: Subject to any disclaimer, the term of this patent is extended or adjusted under 35 U.S.C. 154(b) by 0 days.

(21) Appl. No.: 14/924,700

(22) Filed: Oct. 27, 2015

(65) Prior Publication Data

US 2016/0119077 A1    Apr. 28, 2016

(30) Foreign Application Priority Data

Oct. 27, 2014    (CN) .......................... 2014 1 0582572

(51) Int. Cl.
*H04B 10/50*    (2013.01)
*H04B 10/66*    (2013.01)
*H04B 10/516*   (2013.01)

(52) U.S. Cl.
CPC .................. *H04B 10/516* (2013.01)

(58) Field of Classification Search
CPC .............................. H04B 10/505; H04B 10/66
See application file for complete search history.

(56) References Cited

U.S. PATENT DOCUMENTS

| | | | |
|---|---|---|---|
| 6,643,417 B2 * | 11/2003 | Strutz | H03D 9/00 359/326 |
| 2010/0086303 A1 * | 4/2010 | Qian | H04J 14/06 398/65 |
| 2016/0119078 A1 * | 4/2016 | Kakande | H04J 14/06 398/65 |

* cited by examiner

*Primary Examiner* — Shi K Li
(74) *Attorney, Agent, or Firm* — Bryan Cave LLP (57) ABSTRACT

The present disclosure relates to a dual-channel orthogonal carriers assisted optical signal transmitting device, and a direct detection method and a direct detection system using the dual-channel orthogonal carriers assisted optical signal. The direct detection system using the dual-channel orthogonal carriers assisted optical signal comprises a transmitting device and a receiving device. The transmitting device is configured to generate and transmit a dual-channel orthogonal carriers assisted optical signal to be detected, wherein the dual-channel orthogonal carriers assisted optical signal is modulated with a modulation signal. The receiving device is configured to receive the dual-channel orthogonal carriers assisted optical signal, and recover amplitude and phase information of the modulation signal based on the dual-channel orthogonal carriers assisted optical signal.

19 Claims, 6 Drawing Sheets

DUAL-CHANNEL ORTHOGONAL CARRIERS ASSISTED OPTICAL SIGNAL TRANSMITTING DEVICE, DIRECT DETECTION METHOD AND SYSTEM

CROSS-REFERENCE TO RELATED APPLICATIONS

This application claims priority to Chinese Patent Application No. 201410582572.5, filed on Oct. 27, 2014. Chinese Patent Application No. 201410582572.5 is incorporated herein by reference in its entirety.

TECHNICAL FIELD

The present disclosure relates to the field of optical signal modulation and direction detection, and more specifically, to a dual-channel orthogonal carriers assisted optical signal transmitting device, and a direct detection method and a direct detection system using the dual-channel orthogonal carriers assisted optical signal.

BACKGROUND

A direct detection system generally consists of a pair of an optical intensity modulator and a photoelectric detector. At the present stage, the direct detection system mainly supports an intensity-modulated OOK (On-Off Keying) signal, a PAM (Pulse Amplitude Modulation) signal, or further complex signals such as a DMT (Discrete Multi-Tone) signal and a CAP (Carrier-less Amplitude Phase) signal. These signal formats are commonly characterized in that: only the intensity information of light is involved without the phase information. Therefore, it is only needed to adopt an optical intensity modulator (such as a direct modulation laser or an electro absorption modulator) on the transmitting side so as to fulfill the conversion from electric signal to light signal. Accordingly, it is only needed to adopt a photoelectric detector to fulfill the photo-electric conversion. The simple structure and ease of implementation led the above system to be the preferred solution for a low-cost optical transmission system.

However, with the continuous upgrading of the internet service, users are proposing higher demands on the performance of the optical transmission network. For example, a higher spectrum efficiency, a longer transmission distance and a low-cost and low-power solution are excepted. Though the traditional direct detection method maintains a cost advantage, it can hardly support a phase modulation format such as QAM (Quadrature Amplitude Modulation) and OFDM (Orthogonal Frequency Division Multiplexing), since the amplitude and phase information of the transmission signal cannot be detected simultaneously. In addition, in cases in which the signal bandwidth is extremely high, the performance of the system suffers from chromatic dispersion, thus it is difficult to implement a long distance transmission without dispersion compensation fiber.

SUMMARY

The present disclosure is provided in view of the above problems. The present disclosure provides a dual-channel orthogonal carriers assisted optical signal transmitting device, and a direct detection method and a direct detection system using the dual-channel orthogonal carriers assisted optical signal, which can detect the amplitude and phase of the transmission signal simultaneously and achieve a transmission distance over 100 km (kilometers).

According to an aspect of the present disclosure, there is provided a direct detection method using a dual-channel orthogonal carriers assisted optical signal comprising: generating a first optical carrier and a second optical carrier having different carrier frequencies; coupling the first optical carrier with the second optical carrier to generate a first combined signal path; modulating the first optical carrier and the second optical carrier in the first combined signal path simultaneously with a modulation signal to generate a first modulated signal and a second modulated signal; shifting a phase of the second optical carrier by 90 degrees to generate a phase-shifted second optical carrier, and coupling the first optical carrier with the phase-shifted second optical carrier to generate a second combined signal path; and with the first optical carrier in the second combined signal path as a first optical pilot, and with the phase-shifted second optical carrier in the second combined signal path as a second optical pilot, coupling the first optical pilot with the first modulated signal and coupling the second optical pilot with the second modulated signal to generate and transmit the dual-channel orthogonal carriers assisted optical signal to be detected.

According to another aspect of the present disclosure, there is provided a dual-channel orthogonal carriers assisted optical signal transmitting device comprising: a first light source unit configured to emit a first optical carrier; a second light source unit configured to emit a second optical carrier, the first optical carrier and the second optical carrier having different carrier frequencies; a 90 degree optical hybrid unit configured to couple the first optical carrier with the second optical carrier to generate a first combined signal path, shift a phase of the second optical carrier by 90 degree to generate a phase-shifted second optical carrier, and couple the first optical carrier with the phase-shifted second optical carrier to generate a second combined signal path; an IQ modulation unit configured to modulate the first optical carrier and the second optical carrier in the first combined signal path simultaneously with a modulation signal to generate a first modulated signal and a second modulated signal; and an optical coupling unit configured to take the first optical carrier in the second combined signal path as a first optical pilot, take the phase-shifted second optical carrier in the second combined signal path as a second optical pilot, couple the first optical pilot with the first modulated signal and couple the second optical pilot with the second modulated signal to generate and transmit a dual-channel orthogonal carriers assisted optical signal to be detected.

According to yet another aspect of the present disclosure, there is provided a direct detection system using a dual-channel orthogonal carriers assisted optical signal comprising: a transmitting device configured to generate and transmit the dual-channel orthogonal carriers assisted optical signal to be detected, wherein the dual-channel orthogonal carriers assisted optical signal is modulated with a modulation signal; and a receiving device configured to receive the dual-channel orthogonal carriers assisted optical signal, and recover amplitude and phase information of the modulation signal based on the dual-channel orthogonal carriers assisted optical signal.

It is understood that both the above general description and the following detailed description are illustrative, and are intended to provide further explanation on the technologies to be claimed.

BRIEF DESCRIPTION OF THE DRAWINGS

The above and other objects, features and advantages of the present disclosure will become more apparent by more detailed descriptions of embodiments of the present disclosure in connection with figures. The figures are used to provide further understanding of embodiments of the present disclosure, constitute part of the specification, and explain the present disclosure together with embodiments of the present disclosure, but do not limit the present disclosure. In the figures, the same reference numbers usually represent the same elements or steps.

DETAILED DESCRIPTION OF THE EMBODIMENTS

In order to make objects, technical solutions and advantages of the present disclosure more obvious, exemplary embodiments of the present disclosure will be described in detail with reference to the figures in the following. Obviously, the described embodiments are only some of the embodiments of the present disclosure, but not all the embodiments. It should be understood that the present disclosure is not limited by exemplary embodiments described herein. All other embodiments obtained by those skilled in the art based on the embodiments described in the present disclosure without creative work fall in the protection scope of the present disclosure.

In the following, preferable embodiments of the present disclosure will be described in detail with reference to the figures. Generally, the present disclosure provides a novel fading-free direct detection method and system using a dual-channel orthogonal carriers assisted optical signal, wherein two bands spaced at 100-GHz are used to accommodate the complex-value OFDM signal. Further, the signals are coupled with a pair of optical carriers of orthogonal phases. By doing so, real and imaginary parts of the complex-value OFDM signal can be recovered from the two bands, respectively. In the following, the transmitting device and the receiving device in the direct detection system and the direct detection system and method will be described.

Figure 1:
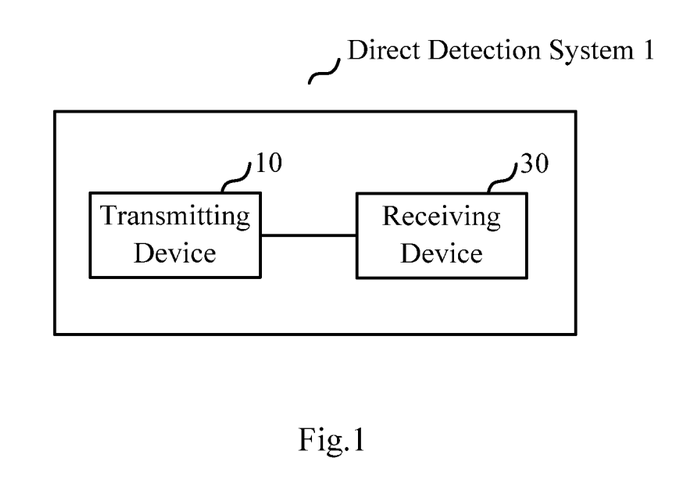
FIG. 1 is a functional block diagram illustrating a direct detection system using a dual-channel orthogonal carriers assisted optical signal according to an embodiment of the present disclosure.

FIG. 1 is a functional block diagram illustrating a direct detection system using a dual-channel orthogonal carriers assisted optical signal according to an embodiment of the present disclosure. As shown in FIG. 1, the direct detection system 1 using the dual-channel orthogonal carriers assisted optical signal comprises a transmitting device 10 and a receiving device 30. The transmitting device 10 is configured to generate and transmit a dual-channel orthogonal carriers assisted optical signal to be detected, wherein the dual-channel orthogonal carriers assisted optical signal is modulated with a modulation signal. The receiving device 30 is configured to receive the dual-channel orthogonal carriers assisted optical signal, and recover amplitude and phase information of the modulation signal based on the dual-channel orthogonal carriers assisted optical signal. In the following, the exemplary structures of the transmitting device 10 and the receiving device 30 will be explained in detail with reference to FIG. 2 to FIG. 4.

Figure 2:
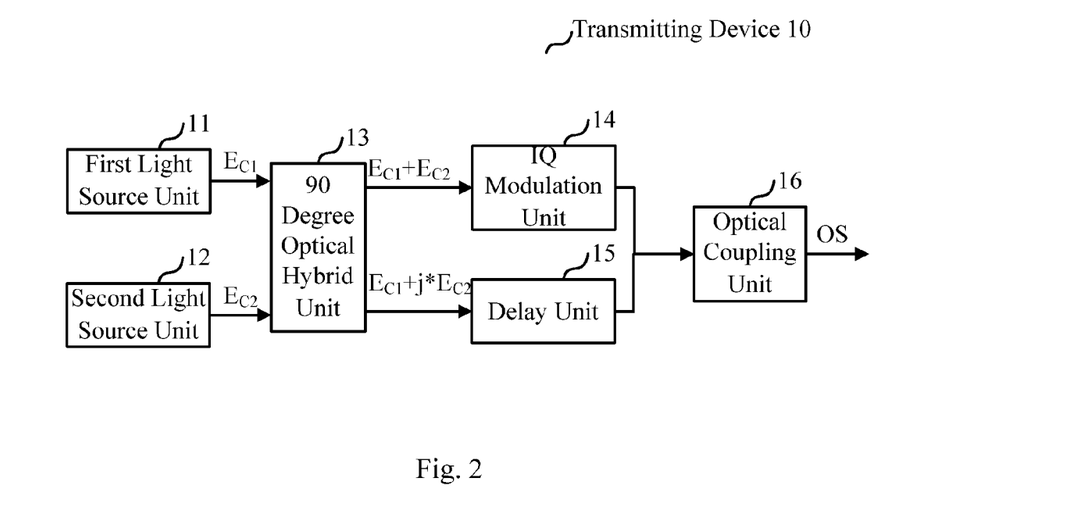
FIG. 2 is a functional block diagram illustrating a dual-channel orthogonal carriers assisted optical signal transmitting device according to an embodiment of the present disclosure.

FIG. 2 is a functional block diagram illustrating a dual-channel orthogonal carriers assisted optical signal transmitting device according to an embodiment of the present disclosure. As shown in FIG. 2, the dual-channel orthogonal carriers assisted optical signal transmitting device 10 comprises a first light source unit 11, a second light source unit 12, a 90 degree optical hybrid unit 13, an IQ (In-phase/Quadrature) modulation unit 14, a delay unit 15 and an optical coupling unit 16. It should be understood that the first light source unit 11, the second light source unit 12, the 90 degree optical hybrid unit 13, the IQ modulation unit 14, the delay unit 15 and the optical coupling unit 16 can, for example, be configured by hardware, software, firmware, or any suitable combination of the above.

In particular, the first light source unit 11 is configured to emit a first optical carrier $E_{c1}$, and the second light source unit 12 is configured to emit a second optical carrier $E_{c2}$. In an embodiment of the present disclosure, the first optical carrier $E_{c1}$ and the second optical carrier $E_{c2}$ have different carrier frequencies. Furthermore, in an embodiment of the present disclosure, the frequency space between the first optical carrier $E_{c1}$ and the second optical carrier $E_{c2}$ is less than 1 THz (terahertz).

The 90 degree optical hybrid unit 13 is configured to couple the first optical carrier $E_{c1}$ with the second optical carrier $E_{c2}$ to generate a first combined signal path $E_{c1}+E_{c2}$, that is, the upper path in FIG. 2. The 90 degree optical hybrid unit 13 is further configured to shift the phase of the second optical carrier $E_{c2}$ by 90 degree to generate a phase-shifted second optical carrier $j*E_{c2}$, and couple the first optical carrier $E_{c1}$ with the phase-shifted second optical carrier $j*E_{c2}$ to generate a second combined signal path $E_{c1}+j*E_{c2}$, that is, the lower path in FIG. 2.

The IQ modulation unit 14 is configured to modulate the first optical carrier $E_{c1}$ and the second optical carrier $E_{c2}$ in the first path (that is, the upper path) of combined signal simultaneously with a modulation signal to generate a first modulated signal $E_{s1}$ and a second modulated signal $E_{s2}$. In an embodiment of the present disclosure, the first and second modulated signal—are modulated by a complex—value OFDM signal.

The delay unit 15 is configured to delay the second path (that is, the lower path) of combined signal to match a path length of the second combined signal path with that of the first combined signal path. In an embodiment of the present disclosure, both lengths of the upper/lower paths should be matched to guarantee the 'relative orthogonality' between the OFDM signals and the optical carriers.

The optical coupling unit 16 is configured to take the first optical carrier $E_{c1}$ in the first combined signal path as a first optical pilot, take the phase-shifted second optical carrier $j*E_{c2}$ in the second combined signal path as a second optical pilot, couple the first optical pilot with the first modulated signal $E_{s1}$ and couple the second optical pilot with the second modulated signal $E_{s2}$ to generate and transmit a dual-channel orthogonal carriers assisted optical signal OS to be detected. That is, the second path from the delay unit 15 is directly coupled with the output of the IQ modulation unit 14.

Figure 3:
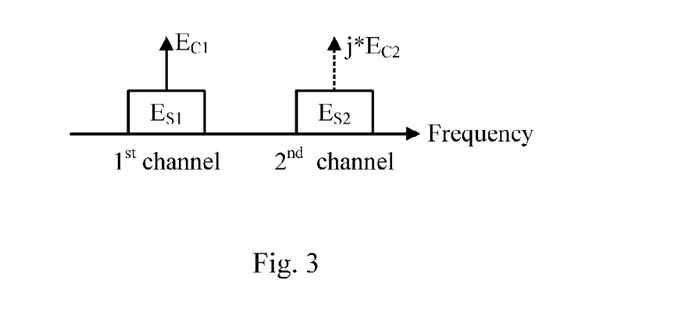
FIG. 3 is a schematic diagram illustrating the spectrum of the dual-channel orthogonal carriers assisted optical signal according to an embodiment of the present disclosure.

FIG. 3 is a schematic diagram illustrating the spectrum of the dual-channel orthogonal carriers assisted optical signal according to an embodiment of the present disclosure. As shown in FIG. 3, the dual-channel orthogonal carriers assisted optical signal OS emitted from the transmitting device 10 comprises two channels, that is, the first channel and the second channel. On the first channel, the first optical pilot $E_{c1}$ is coupled with the first modulated signal $E_{s1}$. On the second channel, the second optical pilot $j*E_{c2}$ is coupled with the second modulated signal $E_{s2}$. The frequency space between the first optical pilot $E_{c1}$ and the second optical pilot $j*E_{c2}$ is less than 1 THz.

Figure 4:
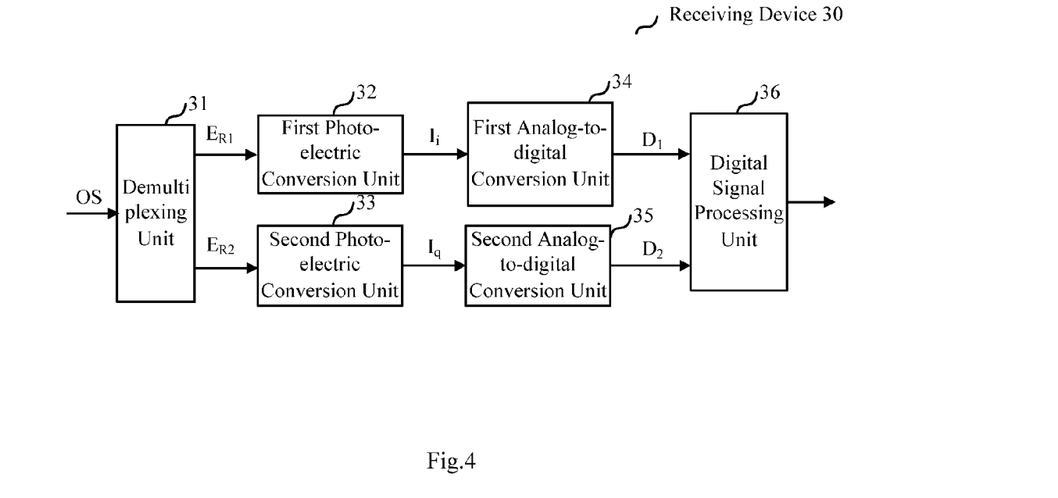
FIG. 4 is a functional block diagram illustrating a dual-channel orthogonal carriers assisted optical signal receiving device according to an embodiment of the present disclosure.

FIG. 4 is a functional block diagram illustrating a dual-channel orthogonal carriers assisted optical signal receiving device according to an embodiment of the present disclosure. The dual-channel orthogonal carriers assisted optical signal OS emitted from the transmitting device 10 is received by the receiving device 30. As shown in FIG. 4, the dual-channel orthogonal carriers assisted optical signal receiving device 30 comprises a demultiplexing unit 31, a first photo-electric conversion unit 32, a second photo-electric conversion unit 33, a first analog-to-digital conversion unit 34, a second analog-to-digital conversion unit 35 and a digital signal processing unit 36. It should be understood that the demultiplexing unit 31, the first photo-electric conversion unit 32, the second photo-electric conversion unit 33, the first analog-to-digital conversion unit 34, the second analog-to-digital conversion unit 35 and the digital signal processing unit 36 can, for example, be configured by hardware, software, firmware, or any suitable combination of the above.

In particular, the demultiplexing unit 31 is configured to demultiplex the dual-channel orthogonal carriers assisted optical signal OS received from the transmitting device 10 as shown in FIG. 2 to acquire a first receiving signal path $E_{R1}$ including the first optical pilot and the first modulated signal, and a second receiving signal path $E_{R2}$ including the second optical pilot and the second modulated signal.

The first photo-electric conversion unit 32 is configured to convert the first receiving signal path $E_{R1}$ into a first path photocurrent $I_i$. The second photo-electric conversion unit 33 is configured to convert the second receiving signal path $E_{R2}$ into a second path photocurrent $I_q$. In an embodiment of the present disclosure, the first photo-electric conversion unit 32 and the second photo-electric conversion unit 33 are configured by two single-end photodiodes (PDs). The photo currents of the pair of PDs, represented as $I_i$ and $I_q$, are given by $$I_i = |E_s + E_c|^2 = |E_c|^2 + |E_s|^2 + 2Re\{E_s E_c^*\} \quad (1)$$

$$I_q = |E_s + j*E_c|^2 = |E_c|^2 + |E_s|^2 + 2Im\{E_s E_c^*\} \quad (2)$$

where $|E_c|$ is the complex envelope of the first optical pilot, $|j*E_c|$ is the complex envelope of the second optical pilot, $|E_s|$ is the complex envelope of the first modulated signal and the second modulated signal. It is straightforward to reconstruct the complex-value signal by combining equation (1) and (2) to acquire equation (3):

$$I_i + j*I_q = (1+j)|E_c|^2 + (1+j)|E_s|^2 + 2E_c^* \cdot E_s \quad (3)$$

There are three parts in the resulting equation (3). The first one is a DC (direct current) part that can be ignored. The second part is the signal-to-signal beat noise (SSBN) that can be approximately removed by one-iteration SSBN cancellation, when the carrier-to-signal power ratio (CSPR) is high enough. The last term presents the fading-free complex-value signal.

The first analog-to-digital conversion unit 34 is configured to sample the first path photocurrent $I_i$ to acquire a first sample signal D1, and the second analog-to-digital conversion unit 35 is configured to sample the second path photocurrent $I_q$ to acquire a second sample signal D2. The digital signal processing unit 36 is configured to recover the amplitude and phase information of the modulation signal based on the first sample signal D1 and the second sample signal D2.

Figure 5A:
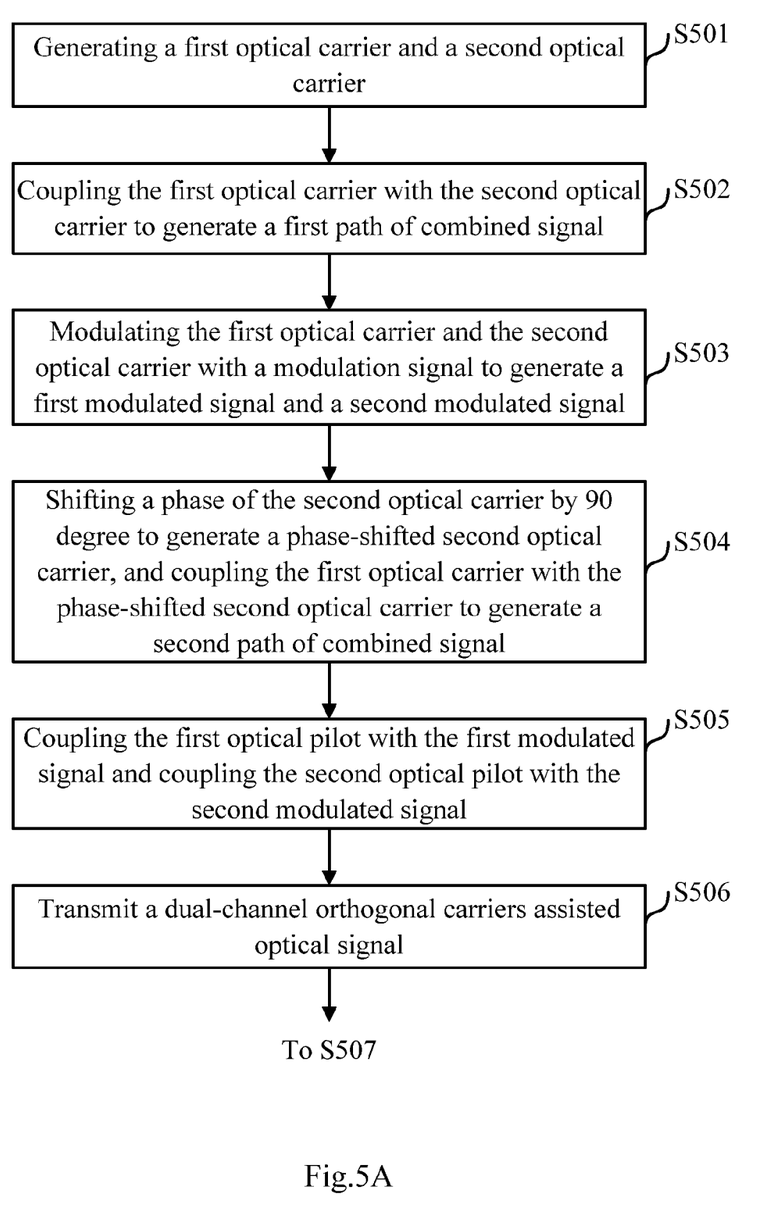
FIGS. 5A and 5B are flowcharts illustrating a direct detection method using the dual-channel orthogonal carriers assisted optical signal according to an embodiment of the present disclosure.
Figure 5B:
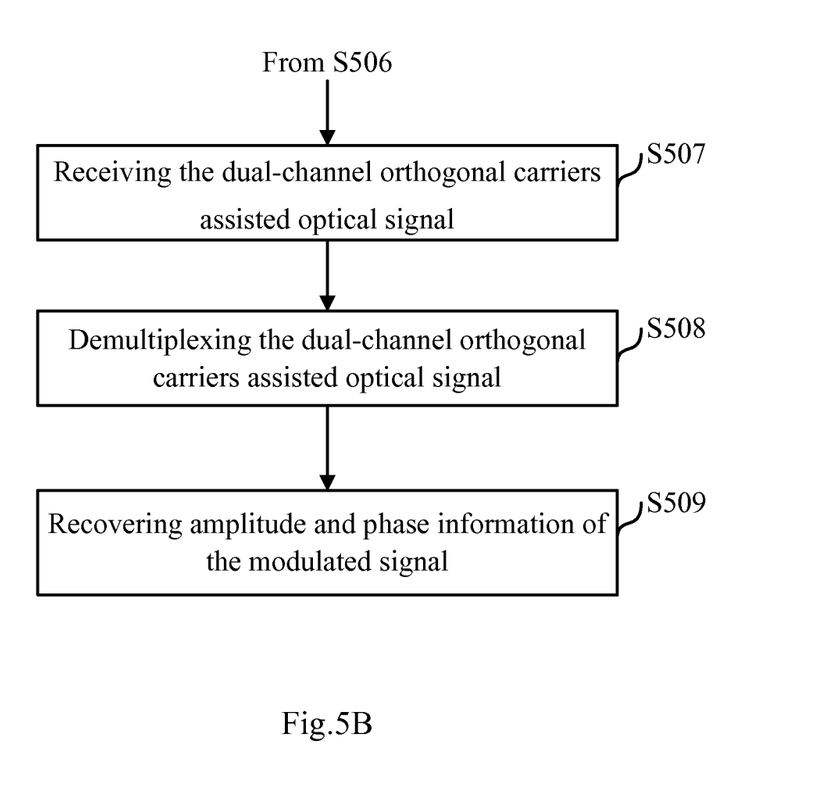

FIGS. 5A and 5B are flowcharts illustrating a direct detection method using the dual-channel orthogonal carriers assisted optical signal according to an embodiment of the present disclosure. As shown in FIGS. 5A and 5B, the direct detection method according to an embodiment of the present disclosure comprises the following steps.

In step S501, generating a first optical carrier and a second optical carrier having different carrier frequencies. As discussed above, the first optical carrier $E_{c1}$ and the second optical carrier $E_{c2}$ have different carrier frequencies, and the frequency space between the first optical carrier $E_{c1}$ and the second optical carrier $E_{c2}$ is less than 1 THz. Thereafter, the processing proceeds to step S502.

In step S502, coupling the first optical carrier with the second optical carrier to generate a first combined signal path. Thereafter, the processing proceeds to step S503.

In step S503, modulating the first optical carrier and the second optical carrier in the first combined signal path simultaneously with a modulation signal to generate a first modulated signal and a second modulated signal. Thereafter, the processing proceeds to step S504.

In step S504, shifting the phase of the second optical carrier by 90 degrees to generate a phase-shifted second optical carrier, and coupling the first optical carrier with the phase-shifted second optical carrier to generate a second combined signal path. Thereafter, the processing proceeds to step S505.

In step S505, with the first optical carrier in the second combined signal path as a first optical pilot, and with the phase-shifted second optical carrier in the second combined signal path as a second optical pilot, coupling the first optical pilot with the first modulated signal and coupling the second optical pilot with the second modulated signal to generate a dual-channel orthogonal carriers assisted optical signal to be detected. Thereafter, the processing proceeds to step S506.

In step S506, transmitting the dual-channel orthogonal carriers assisted optical signal. The above step S501 to step S506 are performed by the transmitting device 10. After the dual-channel orthogonal carriers assisted optical signal is transmitted from the transmitting device 10, the processing proceeds to the steps performed by the receiving device 30.

In step S507, receiving the dual-channel orthogonal carriers assisted optical signal. Thereafter, the processing proceeds to step S508.

In step S508, demultiplexing the dual-channel orthogonal carriers assisted optical signal to acquire a first receiving signal path including the first optical pilot and the first modulated signal, and a second receiving signal path including the second optical pilot and the second modulated signal. Thereafter, the processing proceeds to step S509.

In step S509, recovering amplitude and phase information of the modulation signal based on the first receiving signal path and the second receiving signal path.

Figure 6:
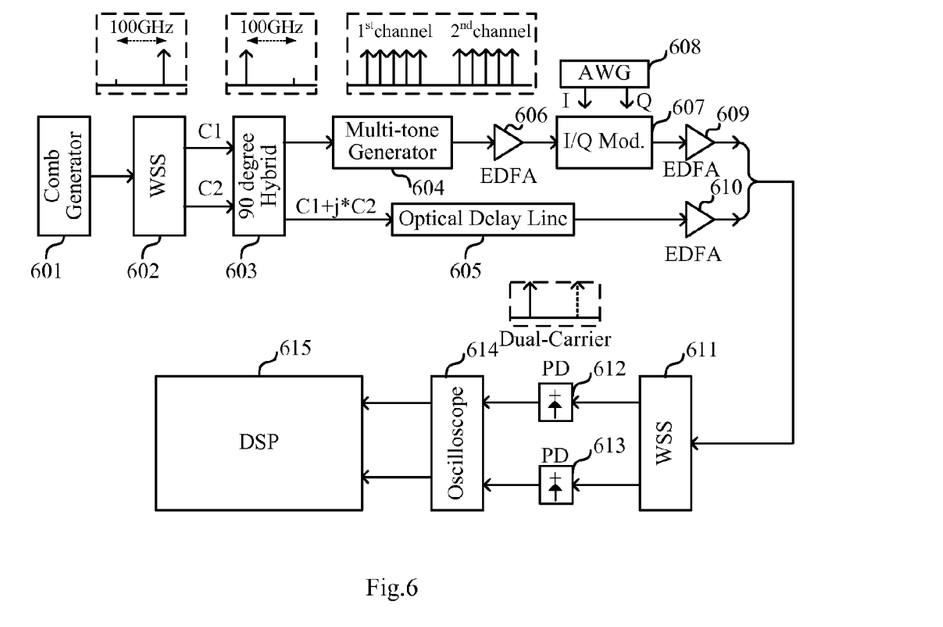
FIG. 6 is schematic diagram further illustrating the direct detection system using the dual-channel orthogonal carriers assisted optical signal according to an embodiment of the present disclosure.

FIG. 6 is schematic diagram further illustrating the direct detection system using the dual-channel orthogonal carriers assisted optical signal according to an embodiment of the present disclosure. FIG. 6 shows a specific embodiment of the direct detection system of the present disclosure.

Firstly, a comb generator 601 generates multiple optical carriers spacing at 25 GHz. The comb generator 601 is composed of a phase modulator (PM) driven by a 25-GHz RF (radio frequency) source. By using a wavelength selective switch (WSS) 602, two optical carriers at 100-GHz spacing (193.35 THz and 193.25 THz) are selected. The selected optical carriers (C1 and C2) are then mixed by a 90 degree optical hybrid 603. In the upper path, {C1+C2} is fed into another comb generator to produce 2×5 optical comb lines. Such a generator 604 is composed of an intensity modulator (IM) driven by a 12-GHz RF source. An optical I/Q (In-phase/Quadrature) modulator 607 is used to load the complex-value OFDM signal, which is generated by an arbitrary waveform generator (AWG) 608. The FFT (fast Fourier transform) size of the OFDM signal is 256, in which 218 subcarriers are filled with 4-QAM signal. The length of cyclic prefix (CP) is 1/16 of the FFT size. The first 10 symbols are used as training symbols (TS), which is followed by 100 payload symbols. The AWG 608 operates at 12-GS/s sampling rate. The FEC (forward error correction) is 7% overhead, corresponding to a 8.5-dB threshold for the Q (Quadrature) factor. The net data rate of the 5 sub-band OFDM signal can be calculated as follows: 218 (number of loaded subcarriers)/256×12 (sampling rate)×100 (payload symbols)/110 (symbols of payloads and trainings)×2 (bits per sample)×5 (sub-band number)×0.941 (CP overhead)×0.935 (7% FEC)=81.75 Gb/s.

In the lower path, {C1+j*C2} is delayed by a tunable optical delay line 605 to match the length with the upper path. Then, signals from the upper path and lower path are coupled by a 3-dB optical coupler. The CSPR can be adjusted by tuning the Erbium-Doped Fiber Amplifiers (EDFAs) 606, 609, and 610 in both the upper and lower paths. Then, the signal is fed into a recirculation loop comprising of four 80-km SSMF (standard single-mode fiber) with Raman amplification to compensate the transmission loss.

At the receiver, the received signal is first amplified. A WSS 611, which is set to 100-GHz grid, is then used to separate the two bands. Each band is direct detected by a 40-GHz bandwidth PD 612 and PD 613. After optical-to-electrical conversion, the electrical signals are sampled by a Oscilloscope 614 operating at 100 GS/s. The offline DSP (digital signal processor) 615 is used to recover the amplitude and phase information. The offline DSP 615 may include skew calibration between the I (In-phase) and Q (Quadrature) branches, simple SSBN cancellation with only one-iteration, chromatic dispersion compensation, window synchronization, FFT, channel and phase estimation, constellation construction and Q-factor/BER (bit error rate) computation.

In the above, a dual-channel orthogonal carriers assisted optical signal transmitting device, and a direct detection method and a direct detection system using the dual-channel orthogonal carriers assisted optical signal are described with reference to FIGS. 1 to 6. The direct detection method and the direct detection system according to the embodiments of the present disclosure can detect the amplitude and phase of the transmission signal simultaneously and achieve a transmission distance over 100 km.

It should be noted that, in the specification, the terms "comprise", "include" and any other variations thereof intend to cover nonexclusive inclusion so that the procedure, the method, the product or the equipment comprising a series of elements comprise not only these elements, but also other elements which are not listed explicitly, or also comprise inherent elements of these procedure, method, product or equipment. In the case that there is no further limitation, elements defined by the expressions "comprise one . . . " do not exclude there being additional identity elements in the procedure, method, product or equipment of the elements.

Finally, it should be noted that, the above-described series of processings do not only comprise processings executed chronologically in the order mentioned here, but also comprise processings executed in parallel or individually but not chronologically.

Through the above description of the implementations, a person skilled in the art can clearly understand that the present disclosure may be implemented in a manner of software plus a necessary hardware platform, and the present disclosure may also be implemented fully by hardware. Based on such understanding, the technical solution of the present disclosure that contributes to the background art may be embodied in whole or in part in the form of a software product. The computer software product may be stored in a storage medium, such as ROM (read only memory)/RAM (random access memory), disk, CD-ROM (compact disk read only memory), and comprise several instructions for causing a computer apparatus (which may be a personal computer, a server, or a network device) to perform the method described in the various embodiments of the present disclosure or certain parts thereof.

Although the present disclosure has been described in detail in the above, specific examples are applied in this text to demonstrate the principles and implementations of the present disclosure, these descriptions of the above embodiments are only to help understand the method of the present disclosure and its core concept. Meanwhile, for a person with ordinary skill in the art, depending on the concepts of the present disclosure, modifications may be made to the specific implementations and applications. To sum up, contents of this specification should not be construed as limitation of the present disclosure.

What is claimed is:

1. A direct detection method using a dual-channel orthogonal carriers assisted optical signal comprising:
    generating a first optical carrier and a second optical carrier having different carrier frequencies;
    coupling the first optical carrier with the second optical carrier to generate a first combined signal path;
    modulating the first optical carrier and the second optical carrier in the first combined signal path simultaneously with a modulation signal to generate a first modulated signal and a second modulated signal;
    shifting a phase of the second optical carrier by 90 degrees to generate a phase-shifted second optical carrier, and coupling the first optical carrier with the phase-shifted second optical carrier to generate a second combined signal path; and
    with the first optical carrier in the second combined signal path as a first optical pilot, and with the phase-shifted second optical carrier in the second combined signal path as a second optical pilot, coupling the first optical pilot with the first modulated signal and coupling the second optical pilot with the second modulated signal to generate and transmit the dual-channel orthogonal carriers assisted optical signal to be detected.

2. The direct detection method according to claim 1, further comprising:
    receiving the dual-channel orthogonal carriers assisted optical signal;

demultiplexing the dual-channel orthogonal carriers assisted optical signal to acquire a first receiving signal path including the first optical pilot and the first modulated signal, and a second receiving signal path including the second optical pilot and the second modulated signal; and recovering amplitude and phase information of the modulation signal based on the first receiving signal path and the second receiving signal path.

3. The direct detection method according to claim 2, wherein demultiplexing the dual-channel orthogonal carriers assisted optical signal to acquire the first receiving signal path including the first optical pilot and the first modulated signal and the second receiving signal path including the second optical pilot and the second modulated signal comprises:

detecting a first path photocurrent corresponding to the first receiving signal path; and detecting a second path photocurrent corresponding to the second receiving signal path.

4. The direct detection method according to claim 3, wherein recovering the amplitude and phase information of the modulation signal based on the first receiving signal path and the second receiving signal path comprises:

recovering the amplitude and phase information of the modulation signal based on the first path photocurrent and the second path photocurrent.

5. The direct detection method according to claim 4, further comprising:

delaying the second combined signal path to match a path length of the second combined signal path with that of the first combined signal path.

6. The direct detection method according to claim 3, further comprising:

delaying the second combined signal path to match a path length of the second combined signal path with that of the first combined signal path.

7. The direct detection method according to claim 2, further comprising:

delaying the second combined signal path to match a path length of the second combined signal path with that of the first combined signal path.

8. The direct detection method according to claim 1, further comprising:

delaying the second combined signal path to match a path length of the second combined signal path with that of the first combined signal path.

9. A dual-channel orthogonal carriers assisted optical signal transmitting device comprising:

a first light source unit configured to emit a first optical carrier;

a second light source unit configured to emit a second optical carrier, the first optical carrier and the second optical carrier having different carrier frequencies;

a 90 degree optical hybrid unit configured to:
couple the first optical carrier with the second optical carrier to generate a first combined signal path;
shift a phase of the second optical carrier by 90 degree to generate a phase-shifted second optical carrier; and
couple the first optical carrier with the phase-shifted second optical carrier to generate a second combined signal path;

an IQ modulation unit configured to modulate the first optical carrier and the second optical carrier in the first combined signal path simultaneously with a modulation signal to generate a first modulated signal and a second modulated signal; and an optical coupling unit configured to, with the first optical carrier in the second combined signal path as a first optical pilot, and the phase-shifted second optical carrier in the second combined signal path as a second optical pilot, couple the first optical pilot with the first modulated signal and couple the second optical pilot with the second modulated signal to generate and transmit a dual-channel orthogonal carriers assisted optical signal to be detected.

10. The dual-channel orthogonal carriers assisted optical signal transmitting device according to claim 9, further comprising:

a delay unit configured to delay the second combined signal path to match a path length of the second combined signal path with that of the first combined signal path.

11. A direct detection system using a dual-channel orthogonal carriers assisted optical signal comprising:

a transmitting device configured to generate and transmit the dual-channel orthogonal carriers assisted optical signal to be detected, wherein the dual-channel orthogonal carriers assisted optical signal is modulated with a modulation signal; and a receiving device configured to receive the dual-channel orthogonal carriers assisted optical signal and recover amplitude and phase information of the modulation signal based on the dual-channel orthogonal carriers assisted optical signal;

wherein the transmitting device comprises:
a first light source unit configured to emit a first optical carrier;
a second light source unit configured to emit a second optical carrier, the first optical carrier and the second optical carrier having different carrier frequencies;
a 90 degree optical hybrid unit configured to:
couple the first optical carrier with the second optical carrier to generate a first combined signal path;
shift a phase of the second optical carrier by 90 degree to generate a phase-shifted second optical carrier; and
couple the first optical carrier with the phase-shifted second optical carrier to generate a second combined signal path;
an IQ modulation unit configured to modulate the first optical carrier and the second optical carrier in the first combined signal path simultaneously with a modulation signal to generate a first modulated signal and a second modulated signal; and
an optical coupling unit configured to, with the first optical carrier in the second combined signal path as a first optical pilot, and with the phase-shifted second optical carrier in the second combined signal path as a second optical pilot, couple the first optical pilot with the first modulated signal and couple the second optical pilot with the second modulated signal to generate and transmit the dual-channel orthogonal carriers assisted optical signal to be detected.

12. The direct detection system according to claim 11, wherein the receiving device comprises:

a demultiplexing unit configured to demultiplex the dual-channel orthogonal carriers assisted optical signal to acquire a first receiving signal path including the first optical pilot and the first modulated signal, and a second receiving signal path including the second optical pilot and the second modulated signal;

a first photo-electric conversion unit configured to convert the first receiving signal path into a first path photocurrent;

a second photo-electric conversion unit configured to convert the second receiving signal path into a second path photocurrent;

a first analog-to-digital conversion unit configured to sample the first path photocurrent to acquire a first sample signal;

a second analog-to-digital conversion unit configured to sample the second path photocurrent to acquire a second sample signal; and a digital signal processing unit configured to recover the amplitude and phase information of the modulation signal based on the first sample signal and the second sample signal.

13. The direct detection system according to claim 12, wherein the transmitting device further comprises:

a delay unit configured to delay the second combined signal path to match a path length of the second combined signal path with that of the first combined signal path.

14. The direct detection system according to claim 12, wherein the transmitting device further comprises:

a delay unit configured to delay the second combined signal path to match a path length of the second combined signal path with that of the first combined signal path, wherein the delay unit comprises a tunable optical delay line.

15. The direct detection system according to claim 12, wherein the transmitting device further comprises:

a delay unit configured to delay the second combined signal path to match a path length of the second combined signal path with that of the first combined signal path, wherein:

the delay unit comprises a tunable optical delay line; and the first optical carrier and the second optical carrier are selected using a wavelength selective switch.

16. The direct detection system according to claim 11, wherein the transmitting device further comprises:

a delay unit configured to delay the second combined signal path to match a path length of the second combined signal path with that of the first combined signal path.

17. The direct detection system according to claim 11, wherein the transmitting device further comprises:

a delay unit configured to delay the second combined signal path to match a path length of the second combined signal path with that of the first combined signal path, wherein the delay unit comprises a tunable optical delay line.

18. The direct detection system according to claim 11, wherein:

the first optical carrier and the second optical carrier are selected using a wavelength selective switch.

19. The direct detection system according to claim 11, wherein the transmitting device further comprises:

a delay unit configured to delay the second combined signal path to match a path length of the second combined signal path with that of the first combined signal path, wherein:

the delay unit comprises a tunable optical delay line; and the first optical carrier and the second optical carrier are selected using a wavelength selective switch.

* * * * *